June 5, 1956  A. L. COULTER  2,749,165

HOOD LATCH ADAPTER

Filed May 10, 1954

Inventor
ALBERT L. COULTER
by
Attys.

2,749,165
HOOD LATCH ADAPTER

Albert L. Coulter, Chicago, Ill.

Application May 10, 1954, Serial No. 428,433

2 Claims. (Cl. 292—171)

My invention relates to an improvement in latches for the hoods of automotive vehicles and has for one of its objects, the provision of a latch adapter for converting automobile latches released from the front of the hood from between the grill, to latches releasable from the inside of the automotive vehicle, and locking the hood when the doors of the vehicle are closed and locked.

Another object of my invention is the provision of a latch assembly universally adapted for various makes of automobile hoods for latching the same for release from the inside of the vehicle.

Still another object of my invention is the provision of a hood latch adapter, adapting an automobile hood latch for release from the dashboard of the vehicle, and of such a thin construction that it is applicable to all standard makes of automotive vehicles.

Still another object of my invention is to provide a simplified and improved form of hood latch including a sliding latch bolt, slidably guided between two relatively flat casing plates and biased to intersect registering apertured portions of the casing plates for the keeper, and operable by the usual Bowden wire for releasing the hood latch from the inside of the vehicle.

These and other objects of my invention will appear from time to time as the following specification proceeds and with reference to the accompanying drawing wherein.

Figure 1:
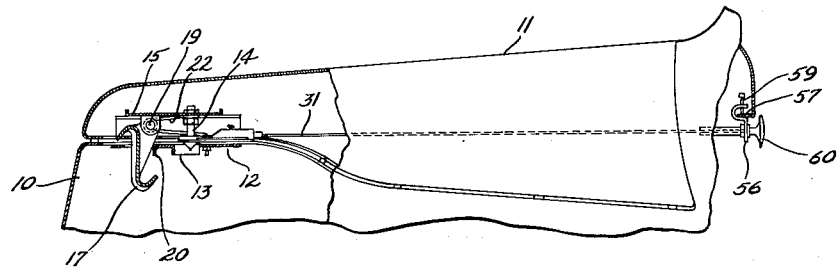
Figure 1 is a view in side elevation of the hood of an automotive vehicle with certain parts thereof broken away and certain other parts shown in section, in order to illustrate one form in which my invention may be embodied.

In the embodiment of my invention illustrated in the drawings, I have shown in Figure 1 an automobile hood of the alligator type, including a stationary hood body 10 and a vertically movable hood cover 11 which may be horizontally hinged at its rear end. The hood body 10 is shown as having a horizontal plate 12 extending thereacross. The plate 12 has a central depending annular flanged portion 13 defining an aperture to accommodate a keeper 14 on a support bracket 15 secured to the hood cover to project therethrough when the hood is locked.

The bracket 15 is also shown as having a safety catch 17, depending therefrom and pivotally mounted thereon on a pivot pin 19. The safety catch 17, as is usual with automobile hood latches, is adapted to extend within a depending flange 20 of the plate 12, to catch on said flange and the plate 12, and catch the hood from full opening movement upon release of the latch bolt. The hood is shown as being biased into an open position upon release of the latch bolt by a torsion spring 22, encircling the pivot pin 19 and having one leg engaging the top surface of the plate and another leg engaging the bottom surface of the bracket 15.

Referring now in particular to the novel form of adapter of my invention, a latch bolt 21, herein shown as being relatively thin and flat, is slidably guided between a lower casing plate 23 and an upper casing plate 24 of a latch casing 25. The lower casing plate 23 is shown as being flat and as having laterally projecting ears 26 and an upright flange 27 at its forward end, projecting above the top surface of said casing plate a distance slightly greater than the thickness of the latch bolt 21 and spacing the upper casing plate 24 from the latch bolt 21 a distance sufficient to provide clearance between the latch bolt and upper casing plate 24. The lower casing plate 23 also has a flange 29 projecting upwardly from the rear end thereof, and forming a mounting for a collar 30 for a Bowden wire 31, for operating the latch, and spacing the rear end portion of the upper casing plate 24 from said lower casing plate.

The upper and lower casing plates 23 and 24 are apertured as indicated by reference characters 33 and 34 respectively, to receive the keeper 14 and accommodate the latch bolt 21 to overlie an upwardly facing shouldered portion 35 thereof, and lock the hood closed.

The upper casing plate 24 is shown as having laterally extending flat ears 36, 36 abutting the upper surfaces of the ears 26, 26 and secured thereto as by nuts and bolts 37, 37 which may also extend through the plate 12 on the hood body, for securing the latch casing thereto with the apertured portions 33 and 34 thereof in registry with the apertured portion defined by the flange 13 of said plate 12.

The upper casing plate 24 has a raised central portion 39, having depending walls 40—40 extending therealong, for spacing the casing plates 23 and 24 apart. The walls 40, 40 extend along opposite sides of the latch bolt 21 and form a rectilinear guide therefor.

Figure 2:
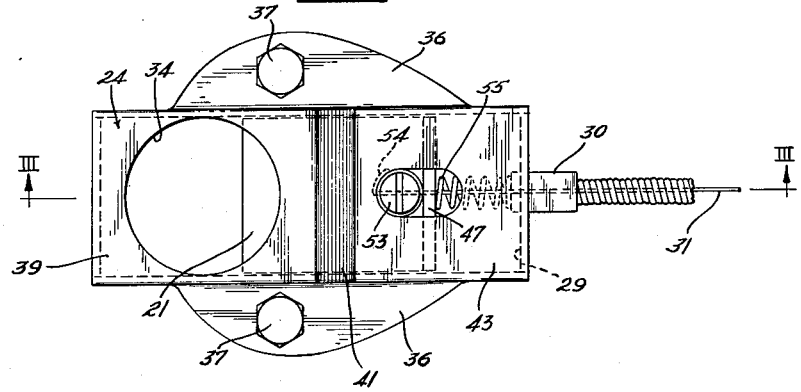
Figure 2 is a top plan view of the hood latch adapter shown in Figure 1.

The raised central portion 39 of the upper casing plate 24 is also shown as having a rearwardly and upwardly sloping face 41 terminating into an elevated guide portion 43, having a guide slot 44 therein for a collar 45. The collar 45 is adapted to form a means for attaching the Bowden wire 31 to the latch bolt, and to form a guide for the latch bolt. As herein shown, the collar 45 extends within a slot 46 extending longitudinally of the latch bolt and abuts a rear upright flange 47 of the latch bolt. The Bowden wire 31 is shown as extending through an apertured portion 49 of the flange 47, and through registering apertured portions 50, 50 of the collar 45 and as being secured thereto as by a machine screw 53 threaded therein and accessible from the top of the latching mechanism. As is shown in Figure 2, the end of the Bowden wire 31 is bent to extend partially around the collar 45 as indicated by reference character 54.

Figure 3:
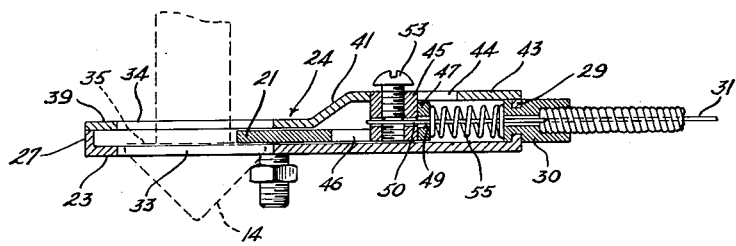
Figure 3 is a sectional view taken substantially along line III—III of Figure 2.
Figure 4:
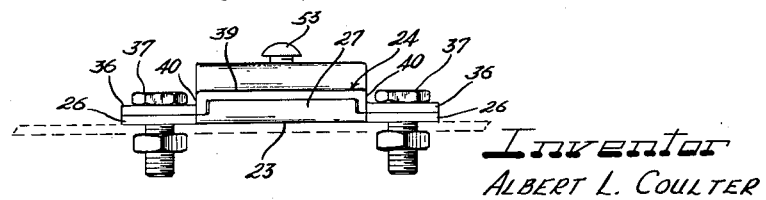
Figure 4 is a front end view of the hood latch adapter.

Encircling the Bowden wire 31, and interposed between the collar 30 and the rear wall of the flange 47, is a compression spring 55, which serves to bias the latch bolt 21 in the extended position shown in Figure 3.

It may be seen from Figures 1 and 3, that when the latch adapter is secured in position on the plate 12 of the hood body of an automotive vehicle, with the registering apertured portions 33 and 34 in registry with the apertured portion defined by the flange 13 and the hood is moved to a closed position, that the inclined face of the keeper 14 will cam the latch bolt 21 backwardly against the action of the compression spring 55, until the camming surface thereof passes beneath the lower surface of the latch bolt, at which time the latch bolt will be moved into its biased position by the spring 55 into engagement with the shoulder 35 thereof, to lock the hood closed. It should further be understood that during hood closing movement, the collar 45 and Bowden wire 31 remain stationary and that the slot 46 in the latch bolt 21 is of sufficient length to accommodate the latch bolt 21 to be retractably moved against the spring 55, when engaged by the keeper 14 without affecting the Bowden wire.

The Bowden wire 31 is shown in Figure 1 as extending backwardly along the hood body, and as being slidably carried in a bracket member 56, shown as being secured to an inwardly extending flange 57 of the dashboard, as by a clamp 59. A knob 60 on the end of the Bowden wire 31 is provided to operate the same from the inside of the car, and thus to retractably move the latch bolt to release the keeper from the inside of the car and to accommodate the spring 23 to open the hood into position to catch the safety catch 17 on the flange 20 of the plate 12.

It may be seen from the foregoing that the latch adapter of my invention is of an extremely thin and compact construction and that the securing flanges thereof are of less vertical dimensions than the latch casing therefor, so as to avoid all interference between the keeper bracket or movable hood and to make the adapter universally adaptable for alligator hoods of the common forms of automotive vehicles in use today, and to enable the front opening latch to be dispensed with, and instead provide a latch releasable from the inside of the car and locking the hood closed when the doors of the car are locked.

It will be understood that various modifications and variations of the present invention may be affected without departing from the scope of the novel concepts thereof.

I claim as my invention:

1. In a latching arrangement for automobile hoods having a safety catch for holding the hood from fully opening upon release of the primary latch therefrom, an adapter latch for adapting the hood to be released from the inside of the car comprising a casing for mounting on the stationary plate of the hood body, said casing having a lower casing plate flat for a greater portion of the area thereof and having an elongated thin latch bolt guided for rectilinear movement therealong and having an upper casing plate secured thereto and forming a guide for the latch bolt, said casing plates having registering apertured portions intersected by the latch bolt, to accommodate a keeper to pass therethrough and retractably move the latch bolt in position to lockingly engage the keeper upon hood closing movement, said latch bolt having an upright flange at the rear end thereof, a spring within said casing abutting said flange and biasing said latch bolt in a projected direction, said upper casing plate having a slot extending longitudinally therealong and said latch bolt having a longitudinally extending slot registering with and extending in advance of said slot in said upper casing plate, a collar guided in said slot of said upper casing plate and extending within said slot of said latch bolt, an operating wire operable from the dashboard of the car, extending through said spring and flange and secured to said collar for retractably moving said latch bolt, said slot in said latch bolt accommodating retractable movement of the latch bolt by the keeper without affecting said collar and operating member.

2. A latch adapter for the hoods of automotive vehicles and the like, comprising a latch casing having two facing vertically spaced casing plates having registering apertured portions accommodating the keeper on the hood to pass therethrough upon hood closing movement, a lower of said casing plates being flat for a major portion of the area thereof and having a rectangular elongated latch bolt slidably supported thereon and also having a forward end portion having an upright flange of a height substantially equal to the thickness of the latch bolt, an upper of said casing plates abutting said flange and having depending wall portions extending along opposite sides of the latch bolt and forming a guide therefore, and having laterally extending ears forming lateral continuations of said wall portions at the lower margins thereof and abutting the lower of said casing plates for securement to the stationary part of the hood body, and for securing said casing plates together, said latch bolt having an upright flange, and said upper casing plate having a raised portion accommodating movement of said flange therealong, a spring within said latch casing seated against said flange and biasing said latch bolt in position to intersect the apertured portions of said casing plates, a collar slidably guided in the upper of said casing plates and abutting said flange, a securing member secured to said collar and extending through said flange outwardly of said casing plates and accommodating release of the latch from the interior of the automobile, and said latch bolt having a slot extending longitudinally from said flange and accommodating said collar to fit therein to accommodate the keeper to retractably move said latch bolt without affecting said collar and the operating means secured thereto.

References Cited in the file of this patent

UNITED STATES PATENTS

| | | |
|---|---|---|
| 426,339 | Stevenson | Apr. 22, 1890 |
| 1,747,092 | Van Note | Feb. 11, 1930 |
| 1,804,387 | Dorsey | May 12, 1931 |
| 2,200,346 | Sepull | May 14, 1940 |